Figure 1:
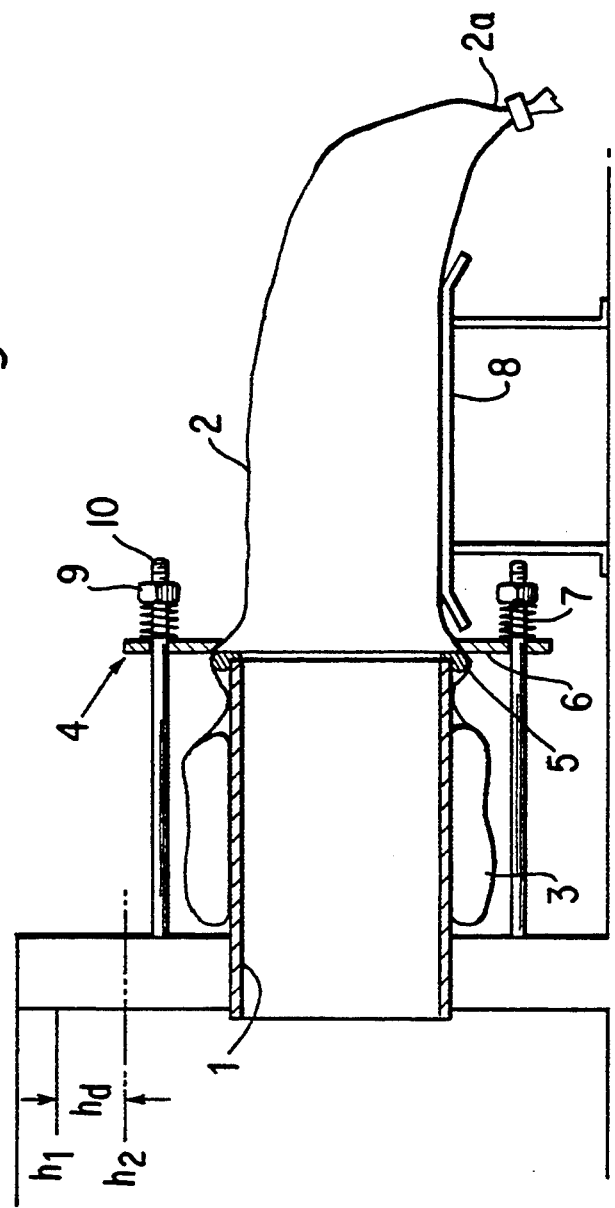

United States Patent [19]
Clough

[11] Patent Number: 5,439,598
[45] Date of Patent: Aug. 8, 1995

[54] INDUSTRIAL FILTRATION APPARATUS AND METHOD FOR THE SEPARATION OF SOLIDS FROM A FLUID STREAM

[75] Inventor: George F. G. Clough, Macclesfield, England

[73] Assignee: North West Water Group plc, Warrington, England

[21] Appl. No.: 291,499

[22] Filed: Aug. 17, 1994

Related U.S. Application Data

[63] Continuation of Ser. No. 844,678, filed as PCT/GB91/0147, Aug. 21, 1991, abandoned.

Foreign Application Priority Data

Aug. 23, 1990 [GB] United Kingdom ............... 9018497

[51] Int. Cl.$^6$ .............................................. B01D 33/64
[52] U.S. Cl. .................................. 210/770; 210/780; 210/97; 210/387
[58] Field of Search ............. 210/770, 780, 97, 323.2, 210/350, 351, 386, 387, 497.01, 497.2

[56] References Cited

U.S. PATENT DOCUMENTS

| | | | |
|---|---|---|---|
| 4,152,268 | 5/1979 | Krause | 210/359 |
| 4,260,496 | 4/1981 | Beer | 210/780 |
| 4,844,798 | 7/1989 | Fox | 210/106 |

FOREIGN PATENT DOCUMENTS

| | | |
|---|---|---|
| 2345399 | 10/1977 | France . |
| 2383130 | 10/1978 | France . |
| 4000149 | 7/1991 | Germany . |
| WO85/05616 | 12/1985 | WIPO . |

*Primary Examiner*—Ivars Cintins
*Attorney, Agent, or Firm*—Nies, Kurz, Bergert & Tamburro; Philip E. Kurz

[57] ABSTRACT

Industrial filtration apparatus for the separation of solids entrained in a fluid stream comprises: a flexible perforate filtering sleeve closed at one end such that fluid can pass through perforations in the sleeve but entrained solids of a predetermined size are retained within the closed end of the sleeve. The apparatus has a structure for holding the sleeve about a discharge pipe for the fluid at a point between the closed and open ends of the sleeve, and for restraining movement of the sleeve away from the pipe; the apparatus is adapted such that in response to a predetermined fluid (e.g. hydraulic) pressure within the sleeve between its closed end and the discharge pipe, the closed end is allowed to be displaced away from the discharge pipe, thereby drawing a portion of the sleeve nearer its open end into a position forward of the pipe to expose said portion to the fluid stream.

18 Claims, 2 Drawing Sheets

INDUSTRIAL FILTRATION APPARATUS AND METHOD FOR THE SEPARATION OF SOLIDS FROM A FLUID STREAM

This application is a continuation, of application Ser. No. 844,678, filed as PCT/GB91/0147, Aug. 21, 1991, now abandoned.

The invention relates to an industrial filtration apparatus and method for the separation of solids, particularly coarse solids, from a flowing stream in which they are entrained.

There are numerous industrial processes in which it is necessary to remove solids, particularly coarse solids, from a fluid stream. One such process is the removal of coarse solids from a sewage stream prior to treatment of the sewage.

The present invention provides an apparatus and method which enables solids to be removed from fluid streams efficiently and cheaply, with minimal disruption of the flow of the stream.

In a first aspect, the present invention provides industrial filtration apparatus for the separation of solids entrained in a fluid stream, the apparatus comprising: a flexible perforate filtering sleeve closed at one end such that fluid can pass through perforations in the sleeve but entrained solids of a predetermined size are retained within the closed end of the sleeve; the apparatus having a structure for holding the sleeve about a discharge orifice for the fluid at a point between the closed and open ends of the sleeve; and for restraining movement of the sleeve away from the orifice; the apparatus being adapted such that in response to a predetermined fluid (e.g. hydraulic) pressure within the sleeve between its closed end and the discharge orifice, the closed end is allowed to be displaced away from the discharge orifice, thereby drawing a portion of the sleeve nearer its open end into a position forward of the orifice to expose said portion to the fluid stream.

The apparatus may be constructed such that it includes a means which serves both to hold the sleeve about the discharge orifice and to restrain movement of the sleeve away from the orifice. Alternatively, it may be constructed such that separate means are provided for holding the sleeve about the discharge orifice, and for providing the restraint. The term "structure" as used hereinabove does not necessarily require all elements of the structure to be mechanically interlinked. Thus if separate restraining means and holding means are provided, they may form part of separate discrete structural entities.

The apparatus can be adapted such that the portion of the sleeve nearer its open end, as described hereinabove, is allowed to be drawn into a position forward of the orifice when a restraining force upon the sleeve is exceeded by a force due to the said predetermined fluid (e.g. hydraulic) pressure within the sleeve acting on an area equal to the cross-section of the discharge orifice.

For example, the holding and restraining structure can comprise a first annular abutment fast with or secured to the perimeter of the discharge orifice, and a second annular abutment resiliently biassed towards the first abutment, the sleeve being gripped therebetween.

Alternatively, the apparatus can be constructed such that the restraining force imposed upon the sleeve is lifted or reduced when a predetermined hydraulic pressure within the sleeve is attained. For example, a pressure sensor can be provided which triggers the lifting or reduction of the restraining force.

Displacement of the closed end of the sleeve away from the discharge orifice may be effected by the hydraulic action of pressurised fluid within the sleeve. Alternatively mechanical means could be employed for drawing a fresh portion of the sleeve into a position forward of the discharge orifice and into contact with the fluid stream. Such mechanical means may be triggered by a signal from a pressure sensor.

The invention will now be described in greater detail with reference to the particular embodiment illustrated in FIGS. 1 and 2.

Figure 2:
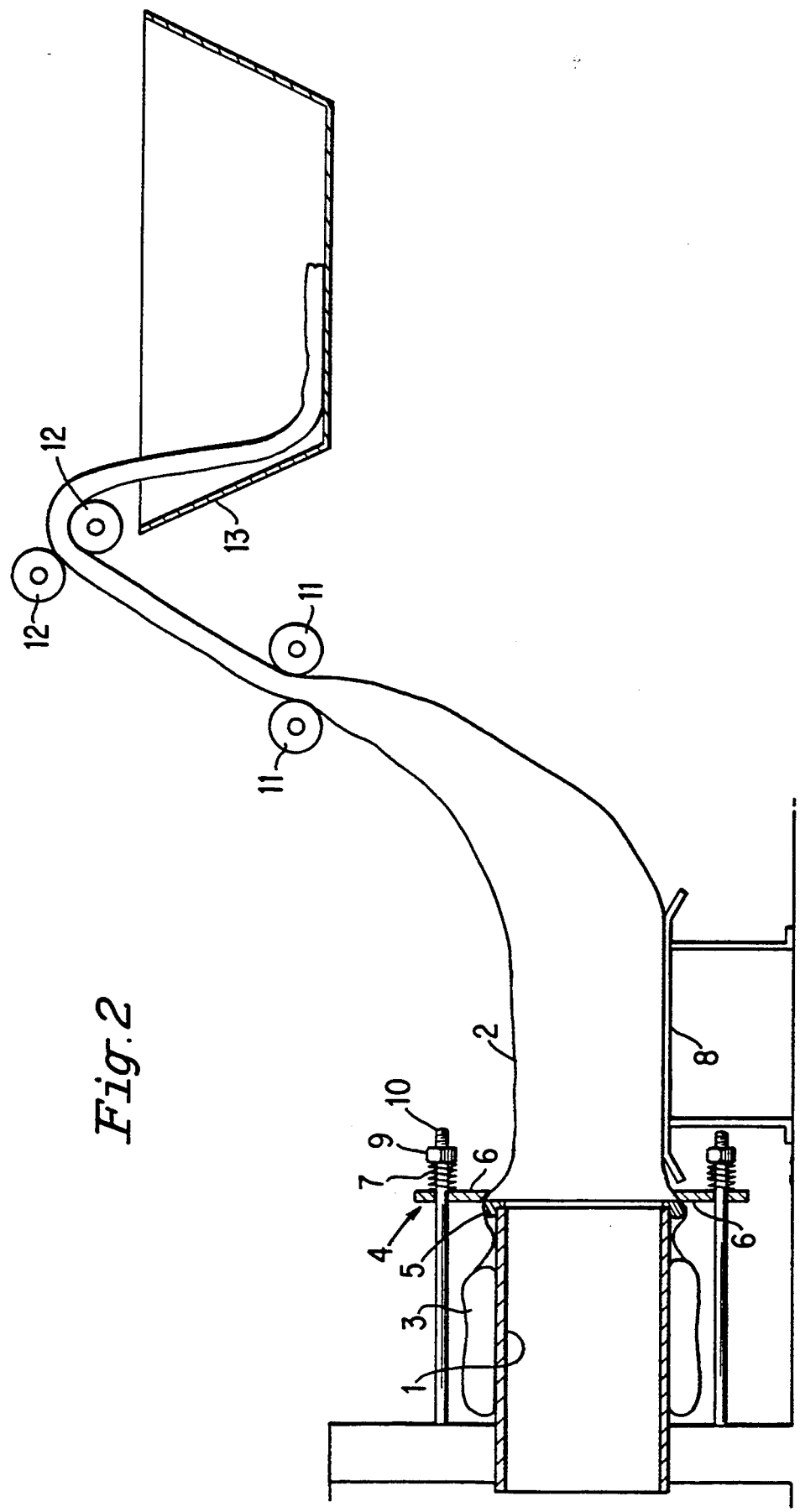

FIG. 1 is a diagrammatic cross-sectional view through one particular apparatus according to the invention, and FIG. 2 illustrates the same apparatus, but used in conjunction with a means for compacting and removing fluid from screened solids.

As shown in FIG. 1, the apparatus comprises a flexible perforate sleeve (2) which is adapted to surround the orifice of a discharge pipe (1).

The end (2a) of the sleeve remote from the discharge pipe is closed. The other end of the sleeve is disposed about the circumference of the discharge pipe in the form of a folded packge or a roll (3), thereby forming a semi-continuous supply of sleeve material.

The material from which the sleeve (2) is formed will depend upon the nature of the fluid and the size and nature of the solids entrained in the fluid. For example, when the fluid is a sewage effluent stream and it is desired only to remove relatively coarse solids from the stream, the material of the sleeve may be in the form of tubular netting of the type used for the packaging of, for example, fruit and vegetables for retail sale. One such form of tubular netting is known by the trade name 'Netlon'. Such netting is commercially available in long lengths and a variety of thicknesses and aperture sizes.

The sleeve (2) is retained about the orifice of the discharge pipe (1) by means of a restraining device, generally indicated by the numeral (4). The restraining device comprises a ring (5) which is fast with the end of the discharge pipe. The ring (5) has an outer surface with a radiussed cross-section which defines a first abutment surface. A second abutment surface is defined by the rounded inner surface of an annular member (6) which is mounted on rods (10) constituting part of a supporting frame, the remainder of which frame is not shown. The second abutment surface is urged against the first abutment surface by means of biassing springs (7) spaced at intervals around the annular member (6). The sleeve (2) passes between the ring (5) and annular member (6) and is held in place by the gripping action between the first and second abutment surfaces.

In use, fluid passes out of the end of the discharge pipe and through the apertures in the sleeve. Any solids entrained in the fluid and having a size larger than the widths of the apertures in the sleeve are retained within the sleeve. As the solids accumulate within the sleeve, there is a progressive restriction of the flow of fluid through the aperture such that excess hydraulic pressure builds up within the sleeve. When the force, due to the pressure differential $h_d$ between the interior and exterior of the sleeve, acting on an area equal to the cross-section of the discharge pipe, exceeds the load due to the springs, the ring (5) and annular member (6) cease to grip the sleeve (2) firmly, and the filled end of the sleeve is forced away from the discharge end of the pipe by the hydraulic pressure within the sleeve. This has the effect of drawing a fresh length of sleeve through the restraining device (4).

As a fresh portion of sleeve becomes exposed to the fluid, the pressure differential $h_d$ is reduced and withdrawal of unused sleeve through the restraining device (4) stops until the pressure again rises to the critical level.

The degree of restraint provided by the restraining device (4) can be varied. For example in the embodiment shown in FIG. 1, this can be achieved by means of threaded retaining collars (9) on the matchingly threaded rods (10) upon which the springs (7) are mounted. The setting of the restraining device can be governed by the extent to which a rise in pressure in the sleeve is acceptable, the strength of the sleeve, the desired tightness of packing of the solids in the sleeve and the degree of restraint arising from friction between the filled portion of the sleeve and a support surface (8) mounted adjacent the orifice of the discharge pipe.

The restraining device illustrated is capable of being easily and quickly dismantled to enable a new package or roll of sleeve material to be put into place.

Solids accumulated in the sleeve require removal from the vicinity of the screening operation and one way of achieving this is simply by withdrawing an additional length of sleeve through the restraining device, tying or clipping it at two points and severing the sleeve between the points of closure. The filled sleeve may then be removed and handled as a package for disposal.

In a further embodiment of the invention as illustrated in FIG. 2, the apparatus may also comprise a device for compressing the screened solids and further removing water from the solids. The compression device may take the form of one or more pairs of rollers (11) and (12). The filled compressed sleeve may then be collected in a suitable container (13) before being removed for disposal.

The rollers (11) and (12) can be used as a mechanical means for assisting or causing the drawing of the sleeve through the restraining device. For example, the rollers can be made responsive to a signal from a pressure sensor upstream thereof. If need be, the rollers may be located some distance away from the orifice, intermediate guides and supports being provided as required.

Rather than being compressed, the filled sleeve may simply be hung on a suitable support and either allowed to air-dry, or dried in a suitable drying apparatus. Subsequent incineration of the waste material could provide a source of heat to assist the drying process.

If the solids materials removed from the fluid stream are sufficiently valuable, the filled sleeve may be conveyed to a means for the removal of the solids from the sleeve. In such circumstances the sleeve could then be reusable.

The apparatus described above and illustrated in FIGS. 1 and 2 is particularly suited to the screening of sewage at the inlet works of sewage treatment plants. It may also be used for additional screening at existing works to improve screening efficiency. Thus additional screens may be incorporated in existing channels, inlets to tanks or at the outfall from the works. Furthermore, it is envisaged that such an apparatus can be used in the storm overflow system at a sewage treatment works to reduce the discharge of coarse solids when the overflow system is in operation, and for the screening of sewage discharged through the storm overflows of sewer systems.

Further applications envisaged include the use of the apparatus in any industrial process where the recovery of coarse solids from fluids in a convenient form for handling would be advantageous, for example in the loose dyeing of fibres in the textile industry and in meat, poultry and fish processing.

It will be appreciated that the above list of applications is not intended to be exhaustive, and the skilled man will readily appreciate that other filtration/screening processes may also be undertaken using apparatus making use of the principles described above and embodied in the claims appended hereto.

We claim:

1. Industrial filtration apparatus for the separation of solids entrained in a fluid stream, the apparatus comprising: a flexible perforated filtering sleeve including means on the exterior of the sleeve which together with the material of the sleeve, structurally closes one end of said sleeve and said sleeve being open at the other end, and further including a reserve amount of sleeve adjacent the open other end, whereby the fluid stream may flow into the open other end; and fluid from said fluid stream may pass through perforations in the sleeve and entrained solids of a predetermined size will be retained within the sleeve behind the closed end of the sleeve; the apparatus further comprising structure, including a discharge pipe for the fluid stream, said pipe having a discharge orifice, and means for maintaining said reserve amount of sleeve on said pipe including means for holding the other end of said sleeve on said pipe and around said discharge orifice at a point between the closed and open ends of the sleeve, said means for holding providing a restraining force for restraining movement of the sleeve from said pipe part and away from the discharge orifice and enabling sufficient holding force on the sleeve so that said sleeve and said closed end provides a predetermined hydraulic fluid pressure, derived from flow of said fluid stream into said sleeve, within the sleeve between its closed end and said discharge orifice which creates a force that draws a fresh portion of the sleeve from said reserve amount of sleeve into a position forward of the pipe discharge orifice to expose said drawn fresh portion of sleeve to the fluid stream, said means for holding and providing a restraining force comprising: a first abutment means interior of the sleeve secured to the perimeter of the discharge pipe adjacent the discharge orifice, and a second abutment means exterior of said sleeve and adjacent the first abutment means having means providing a resilient bias of said second abutment means towards the first abutment means, said sleeve being gripped between the two abutment means; said predetermined fluid pressure exceeding said resilient bias and directly causing fresh sleeve to be provided from said reserve amount of sleeve at a rate governed by the rate of retention of solids within the sleeve behind its said closed one end.

2. Apparatus according to claim 1, further comprising mechanical means for engaging and providing a supplemental force drawing the sleeve forward of the orifice.

3. Apparatus according to claim 1 including means for providing that said holding means reduces the restraining force upon the sleeve when the predetermined hydraulic fluid pressure within the sleeve is attained.

4. Apparatus according to claim 3 further comprising a pressure sensor which is adapted to reduce the restraining force responsive to attaining the predetermined pressure.

5. Apparatus according to claim 1, connected to a sewage stream for removing coarse solids from a sewage stream.

6. Apparatus according to claim 1, wherein said sleeve is a tubular netting.

7. Apparatus as defined in claim 1, further comprising means for compressing the sleeve and filtered solids contained therein to expel fluid therefrom.

8. Apparatus according to claim 7 wherein the compressing means comprises at least one pair of rollers between which the sleeve can be passed and compressed.

9. Apparatus according to claim 8 wherein said rollers constitute a mechanical means for assisting the drawing of the closed end portion of the sleeve forward of the orifice away from the orifice.

10. Apparatus according to claim 7 further comprising means for guiding and supporting the sleeve before and after said means for compressing said sleeve.

11. A method of separating solids entrained in a fluid stream, the method comprising passing the fluid stream through an apparatus as defined in claim 1.

12. Industrial filtration apparatus for the separation of solids entrained in a fluid stream, the apparatus comprising: a flexible perforate filtering sleeve closed at one end and open at the other end whereby the fluid stream may flow into the open other end; and fluid from said fluid stream may pass through perforations in the sleeve and entrained solids of a predetermined size will be retained within the sleeve behind the closed end of the sleeve; the apparatus further comprising structure, including a discharge pipe for the fluid stream, said pipe having a discharge orifice, and means for holding the other end of said sleeve on said pipe and around said discharge orifice at a point between the closed and open ends of the sleeve, said means for holding providing a restraining force for restraining movement of the sleeve from said pipe part and away from the discharge orifice and enabling sufficient holding force on the sleeve so that a predetermined hydraulic fluid pressure within the sleeve between its closed end and said discharge orifice draws a portion of the sleeve between its open end and its said one end into a position forward of the orifice to expose said drawn portion to the fluid stream; said means for holding and providing a restraining force comprising: a first annular abutment interior of the sleeve secured to the perimeter of the pipe adjacent the discharge orifice, and a second annular abutment exterior of said sleeve having means providing a resilient bias of said second abutment towards the first abutment, said sleeve being gripped between the two abutments, said portion of the sleeve nearer its open end being drawn into a position forward of the discharge orifice when said restraining force upon the sleeve is exceeded by said predetermined hydraulic fluid pressure within the sleeve acting on an area equal to the cross-section of the discharge orifice.

13. Apparatus according to claim 12 wherein said second annular abutment is an annular side surface of an annular plate with a central opening disposed around said orifice and slidably mounted on a plurality of axially projecting support rods passing through holes in and spaced around the circumference of the plate.

14. Apparatus according to claim 13 wherein compression springs are mounted on at least some of said support rods and engage and bias said annular plate towards said first annular abutment.

15. Apparatus according to claim 12, further comprising mechanical means for engaging and providing a supplemental force drawing the sleeve forward of the discharge orifice.

16. Apparatus according to claim 12, wherein means are included for providing that said holding means reduces the restraining force upon the sleeve when the predetermined hydraulic fluid pressure within the sleeve is attained.

17. Apparatus according to claim 16, further comprising a pressure sensor which is adapted to reduce the restraining force responsive to attaining the predetermined hydraulic fluid pressure.

18. Industrial filtration apparatus for the separation of solids entrained in a fluid stream, the apparatus comprising: a flexible perforated filtering sleeve closed at one end and open at the other end whereby the fluid stream may flow into the open other end; and fluid from said fluid stream may pass through perforations in the sleeve and entrained solids of a predetermined size will be retained within the sleeve behind the closed end of the sleeve; the apparatus further comprising structure, including a discharge pipe for the fluid stream, said pipe having a discharge orifice, and means for holding the other end of said sleeve on said pipe and around said discharge orifice at a point between the closed and open ends of the sleeve, said means for holding providing a restraining force for restraining movement of the sleeve from said pipe part and away from the discharge orifice and enabling sufficient holding force on the sleeve so that a predetermined hydraulic fluid pressure within the sleeve between its closed end and said discharge orifice draws a portion of the sleeve between its open end and its said one end into a position forward of the orifice to expose said drawn portion to the fluid stream; said means for holding and providing a restraining force comprising: a first abutment means interior of the sleeve secured to the perimeter of the pipe adjacent the discharge orifice, and a second abutment means exterior of said sleeve, and adjacent said first abutment means, having means providing a resilient bias of said second abutment means towards the first abutment means, said sleeve being gripped between the two abutment means, said portion of the sleeve nearer its open end being drawn into a position forward of the discharge orifice when said restraining force upon the sleeve is exceeded by said predetermined hydraulic fluid pressure within the sleeve acting on an area equal to the cross-section of the discharge orifice.

* * * * *